US011195290B2

(12) United States Patent
Morozov et al.

(10) Patent No.: US 11,195,290 B2
(45) Date of Patent: Dec. 7, 2021

(54) APPARATUS AND METHOD FOR ENCODING IN STRUCTURED DEPTH CAMERA SYSTEM

(71) Applicant: Samsung Electronics Co., Ltd., Gyeonggi-do (KR)

(72) Inventors: Kostiantyn Morozov, Kyiv (UA); Dmytro Vavdiiuk, Kyiv (UA); Oleksandr Klimenkov, Kyiv (UA); Andrii Sukhariev, Kyiv (UA); Ivan Safonov, Kyiv (UA)

(73) Assignee: Samsung Electronics Co., Ltd

(*) Notice: Subject to any disclaimer, the term of this patent is extended or adjusted under 35 U.S.C. 154(b) by 28 days.

(21) Appl. No.: 16/743,736

(22) Filed: Jan. 15, 2020

(65) Prior Publication Data

US 2020/0234458 A1  Jul. 23, 2020

(30) Foreign Application Priority Data

Jan. 18, 2019  (KR) ........................ 10-2019-0006885

(51) Int. Cl.
*G06T 7/00* (2017.01)
*G06T 7/521* (2017.01)
(Continued)

(52) U.S. Cl.
CPC .............. *G06T 7/521* (2017.01); *G01B 11/25* (2013.01); *G06K 9/4604* (2013.01); *G06K 9/6215* (2013.01); *G06T 2207/10028* (2013.01)

(58) Field of Classification Search
CPC .......... G06T 7/521; G06T 2207/10028; G01B 11/25; G06K 9/4604; G06K 9/6215
See application file for complete search history.

(56) References Cited

U.S. PATENT DOCUMENTS 8,326,020 B2  12/2012  Lee et al.
9,270,386 B2   2/2016  Bar-On
(Continued)

FOREIGN PATENT DOCUMENTS

EP       3 293 481        3/2018
KR  10-2013-0035291       4/2013
(Continued)

OTHER PUBLICATIONS

International Search Report dated Mar. 17, 2020 issued in counterpart application No. PCT/KR2019/016953, 8 pages.

*Primary Examiner* — Ping Y Hsieh
*Assistant Examiner* — Xiao Liu
(74) *Attorney, Agent, or Firm* — The Farrell Law Firm, P.C.

(57) ABSTRACT

An apparatus and method are provided and include an interface unit configured to receive an electrical signal based on light received from a camera; and at least one processor configured to obtain depth information of a scene based on the electrical signal received from the interface unit, wherein the at least one processor is configured to identify a recognition pattern corresponding to the light received by the camera based on the electrical signal, to obtain a total distance value between properties of a partial source pattern corresponding to a target fragment in the source pattern and properties of a partial recognition pattern corresponding to the target fragment in the recognition pattern, and to estimate depth information of the target fragment based on the obtained total distance value.

9 Claims, 10 Drawing Sheets

3D Object in the scene

(51) Int. Cl.
*G06K 9/46* (2006.01)
*G01B 11/25* (2006.01)
*G06K 9/62* (2006.01)

(56) References Cited

U.S. PATENT DOCUMENTS

| | | |
|---|---|---|
| 9,635,339 B2 | 4/2017 | Campbell et al. |
| 2012/0242829 A1 | 9/2012 | Shin et al. |
| 2014/0056508 A1 | 2/2014 | Lee et al. |
| 2014/0293009 A1* | 10/2014 | Nakazato ............... G01B 11/25 |
| | | 348/46 |
| 2017/0353326 A1 | 12/2017 | Hashiura et al. |
| 2018/0321384 A1 | 11/2018 | Lindner et al. |
| 2019/0011721 A1 | 1/2019 | Gordon |
| 2019/0017814 A1 | 1/2019 | Je et al. |
| 2019/0340776 A1* | 11/2019 | Nash ...................... G06T 7/11 |

FOREIGN PATENT DOCUMENTS

| KR | 1020150041901 | 4/2015 |
|---|---|---|
| KR | 1020150101749 | 9/2015 |
| KR | 1020180126475 | 11/2018 |

* cited by examiner

| SHAPE($\delta_1$) DIFFERENCE | | | |
|---|---|---|---|
|  | □ | △ | ○ |
| □ | 0 | 3 | 1 |
| △ | 3 | 0 | 2 |
| ○ | 1 | 2 | 0 |

| COLOR($\delta_2$) DIFFERENCE | | | | |
|---|---|---|---|---|
|  | Y | G | R | B |
| Y | 0 | 1 | 3 | 8 |
| G | 1 | 0 | 7 | 5 |
| R | 3 | 7 | 0 | 6 |
| B | 8 | 5 | 6 | 0 |

FIG.9A   FIG.9B

| $\pi_0$ (0.5) | $\pi_1$ (0.75) | $\pi_2$ (0.5) |
|---|---|---|
| $\pi_3$ (0.75) | $\pi_4$ (1) | $\pi_5$ (0.75) |
| $\pi_6$ (0.5) | $\pi_7$ (0.75) | $\pi_8$ (0.5) |

FIG.10

APPARATUS AND METHOD FOR ENCODING IN STRUCTURED DEPTH CAMERA SYSTEM

CROSS-REFERENCE TO RELATED APPLICATION(S)

This application is based on and claims priority under 35 U.S.C. § 119 to Korean Patent Application No. 10-2019-0006885, filed on Jan. 18, 2019, in the Korean Intellectual Property Office, the disclosure of which is incorporated by reference herein in its entirety.

BACKGROUND

1. Field

The disclosure relates generally to an encoding apparatus and method for reconstructing a three-dimensional (3D) image based on depth information of an object in a structured depth camera system.

2. Description of Related Art 3D technology is an image processing technology that produces "stereoscopic perception" of the human eyes. Compared to two-dimensional (2D) images on a plane, images to which the 3D technology is applied (hereinafter, "3D images") offer a sensory experience of viewing an object as real to a person. To render a 3D image, a depth is considered in addition to factors (color and luminance) required to render a 2D image.

The 3D technology may find its use in accurate user face identification, realistic 3D avatars, virtual makeup, virtual dressing, 3D photography, gesture recognition, 3D content creation for virtual reality (VR), support of accurate and realistic augmented reality (AR), scene understanding, and 3D scanning.

A 3D image may be reconstructed by combining a picture (2D image) captured by an image sensor of a camera with depth information. The depth information may be measured or obtained by, for example, a 3D sensing camera. In general, 3D sensing may be achieved by using multiple cameras or a depth camera.

In a multiple camera-based scheme, visible light is captured by two or more cameras and depth information is measured based on the captured visible light. The depth camera-based scheme measures depth information by at least one projector and at least one camera. Structured light (SL) and time of flight (ToF) schemes are mainly adopted to use the depth camera.

The SL scheme was proposed to increase the computation accuracy of corresponding points between stereo images in a traditional stereo vision. A depth camera system adopting the SL scheme is referred to as a structured depth camera system.

In the SL scheme, a projector projects a pattern with some regularity onto an object (or a subject) or a scene (or imaging surface) to be restored in 3D, a camera captures the projected pattern, and correspondences between the pattern and the image are obtained.

That is, the projector may radiate (or project) light (or a laser beam) of a source pattern (or a radiation pattern). The camera may receive radiated light reflected from one or more objects, and a transformation between a recognition pattern (or a reflection pattern) and the source pattern is analyzed based on the received light, thereby obtaining depth information.

The transformation of the recognition pattern may be caused by the surface shape of a scene. The scene shape may be a presentation of the depth of, for example, an object or background existing in the scene of the camera.

In the ToF scheme, a time taken for light densely radiated by a projector to be reflected and received by a camera is measured and depth information is obtained based on the time measurement.

The SL scheme is feasible when the distance to an object is short (within 10 meters (m)) because it is likely to have a low recognition rate for a far object. On the other hand, the ToF scheme is feasible for a far object (at a distance of 10 m or more) because it offers a high recognition rate for a far object, relative to the SL scheme.

In general, it is possible to obtain depth information in the SL scheme by using any uniform pattern, a grid, feature points for a simple scene, a plane or a scene without fluctuation of at least depth. However, the SL scheme may have limitations in estimating the depth of an object in a complex scene that includes objects with various or large depth differences.

SUMMARY

The present disclosure has been made to address the above-mentioned problems and disadvantages, and to provide at least the advantages described below.

According to an aspect of the present disclosure, an apparatus for measuring a depth in a structured depth camera system including a projector and a camera for receiving light radiated by a source pattern from the projector and reflected from one or more objects in a scene is provided. The apparatus includes an interface unit configured to receive an electrical signal based on light received from the camera, and at least one processor configured to obtain depth information of the scene based on the electrical signal received from the interface unit. The at least one processor is configured to identify a recognition pattern corresponding to the light received by the camera based on the electrical signal, to obtain a total distance value between properties of a partial source pattern corresponding to a target fragment in the source pattern and properties of a partial recognition pattern corresponding to the target fragment in the recognition pattern, and to estimate depth information of the target fragment based on the obtained total distance value.

In accordance with another aspect of the present disclosure, a method of measuring a depth in a structured depth camera system including a projector and a camera for receiving light radiated by a source pattern from the projector and reflected from one or more objects in a scene is provided. The method includes identifying a recognition pattern corresponding to the light received by the camera based on an electrical signal, obtaining a total distance value between properties of a partial source pattern corresponding to a target fragment in the source pattern and properties of a partial recognition pattern corresponding to the target fragment in the recognition pattern, and estimating depth information of the target fragment based on the obtained total distance value.

BRIEF DESCRIPTION OF THE DRAWINGS

The above and other aspects, features and advantages of certain embodiments of the present disclosure will be more apparent from the following description taken in conjunction with the accompanying drawings, in which:

FIG. 9A is a diagram illustrating difference values that may be obtained by using a first property (shape) in the structured depth camera system, according to an embodiment;

FIG. 9B is a diagram illustrating difference values that may be obtained by using a second property (color) in the structured depth camera system, according to an embodiment;

FIG. 10 is a diagram illustrating distance-based weights that may be assigned to feature points in one fragment in the structured depth camera system, according to an embodiment;

DETAILED DESCRIPTION

Figure 1:
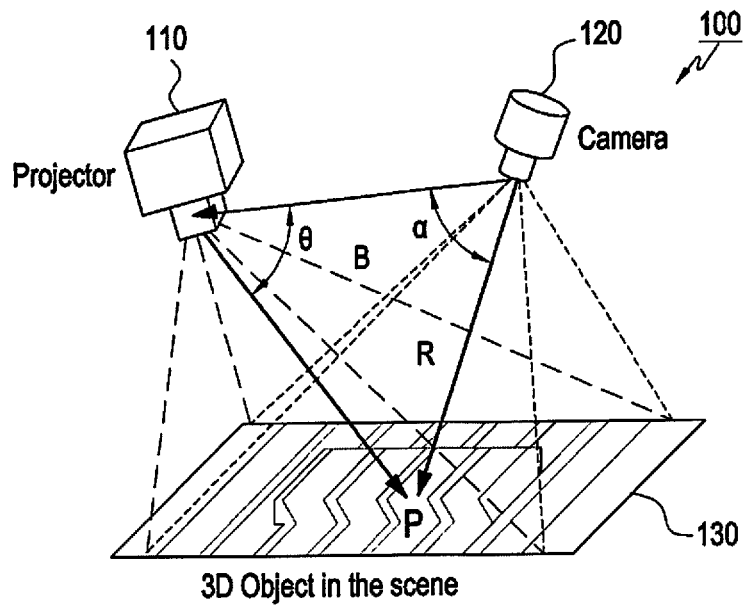
FIG. 1 is a diagram illustrating the configuration of a structured depth camera system, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

An encoding apparatus and method for obtaining depth information of objects having various or large depth differences is provided. The encoding apparatus and method may be used for reconstructing a 3D image based on the obtained depth information in a structured depth camera system.

Additionally, an apparatus and method for providing redundant encoding of a pattern for a structured depth camera is provided.

In addition, an apparatus and method for correcting errors related to detecting and classifying feature points from a recognition pattern of a camera in a structured depth camera system is provided.

The terms "have", "may have", "include", or "may include" may signify the presence of a feature (e.g., a number, a function, an operation, or a component, such as a part), but does not exclude the presence of one or more other features.

As used herein, the expressions "A or B", "at least one of A and B", "at least one of A or B", "one or more of A and B", and "one or more of A or B" may include any and all combinations of one or more of the associated listed items. Terms such as "A or B", "at least one of A and B", or "at least one of A or B" may refer any and all of the cases where at least one A is included, where at least one B is included, or where both of at least one A and at least one B are included.

Terms such as "$1^{st}$", "$2^{nd}$", "first" or "second" may be used for the names of various components irrespective of sequence and/or importance. These expressions may be used to distinguish one component from another component. For example, a first user equipment (UE) and a second UE may indicate different UEs irrespective of sequence or importance. For example, a first component may be referred to as a second component and vice versa without departing from the scope of the disclosure.

It is to be understood that when an element (e.g., a first element) is referred to as being "operatively" or "communicatively" "coupled with", "coupled to", "connected with" or "connected to" another element (e.g., a second element), the element can be directly coupled with/to another element or coupled with/to another element via an intervening element (e.g., a third element). In contrast, when an element (e.g., a first element) is referred to as being "directly coupled with", "directly coupled to", "directly connected with" or "directly connected to" another element (e.g., a second element), it should be understood that there is no intervening element (e.g., a third element).

As used herein, the expressions "configured to" or "set to" may be interchangeably used with the expressions "suitable for", "having the capacity to", "designed to", "adapted to", "made to", or "capable of". The expressions "configured to" or "set to" should not be construed to only mean "specifically designed to" in hardware. Instead, the expression "a device configured to" may mean that the device is "capable of" operating together with another device or other components. For example, a "processor configured to perform A, B, and C" or "a processor set to perform A, B, and C" may mean a dedicated processor (e.g., an embedded processor) for performing a corresponding operation or a generic-purpose processor (e.g., a central processing unit (CPU) or an application processor (AP)) which may perform corresponding operations by executing one or more software programs which are stored in a memory device.

The terms as used in the disclosure are provided to describe specific embodiments, but are not intended to limit the scope of other embodiments. Singular forms of terms and expressions may include plural referents unless the context clearly indicates otherwise. Technical or scientific terms and expressions used in the disclosure may have meanings as generally understood by those of ordinary skill in the art. In addition, terms and expressions, as generally defined in dictionaries, may be interpreted as having the same or similar meanings. Unless otherwise defined, terms and expressions should not be interpreted as having ideally or excessively formal meanings. Additionally, the terms and expressions, as defined in the disclosure, may not be interpreted as excluding embodiments of the disclosure.

Accordingly, a method of obtaining depth information of a target fragment by using the property values of feature points in the target fragment in a radiation pattern of a projector and using the property values of the feature points in the target fragment in a recognition pattern of a camera in a structured depth camera system may be provided.

Thus, a method of obtaining distance values between a source pattern and a recognition pattern, such that the accuracy of depth information of a background and one or more objects in a scene is improved in a structured depth camera system may be provided.

The accuracy of the total distance value of one fragment may be improved by adjusting property-based distance values between feature points of a source pattern corresponding to the fragment and feature points of a recognition pattern corresponding to the fragment, using weights.

FIG. 1 is a diagram illustrating the configuration of a structured depth camera system, according to an embodiment.

Referring to FIG. 1, a structured depth camera system 100 includes at least one projector 110, at least one camera 120, and a scene 130. The structured depth camera system 100 includes one projector 110 and one camera 120. The scene 130 may correspond to a range available for capturing by the camera 120 (i.e., an imaging surface). The scene 130 may be determined, for example, by the field of view (FoV) of the camera 120 and may include a background and at least one object P having different depths.

The projector 110 may be apart from the camera 120 by a predetermined distance (hereinafter, a "baseline"). The baseline may produce a parallax point between the projector 110 and the camera 120.

The projector 110 may radiate light by using a source pattern. The source pattern may be defined in real time or predefined in various manners. The source pattern may be defined, for example, by multiple feature points in the single scene 130 and assigning multiple property values to the respective feature points.

The light that the projector 110 has radiated by using the source pattern may be reflected from the background and the one or more objects P in the scene 130.

The camera 120 may receive the light reflected from the background and the one or more objects P in the scene 130. The light received at the camera 120 may have a recognition pattern. The camera 120 may convert the received light to an electrical signal or obtain the recognition pattern of the received light, and then output the signal or recognition pattern. The recognition pattern may have the multiple feature points defined in the scene 130 and each of the feature points may have multiple property values.

The light that the projector 110 has radiated by using the source pattern may be reflected at different reflection angles according to the depths of the background and the one or more objects P in the scene 130. For similar depths across the background in the scene, for example, the light may be reflected at a predictable reflection angle based on the parallax point. On the other hand, the object P having a large depth difference in the scene 130 may reflect the light at a reflection angle that is difficult to predict. The light reflected from the object P having a large depth difference in the scene 130 may affect other reflected light, causing an error in depth information which is to be estimated later.

A method of correcting an error that may occur in depth information is disclosed. The method is based on multiple properties of feature points included in a source pattern and a recognition pattern.

Figure 2:
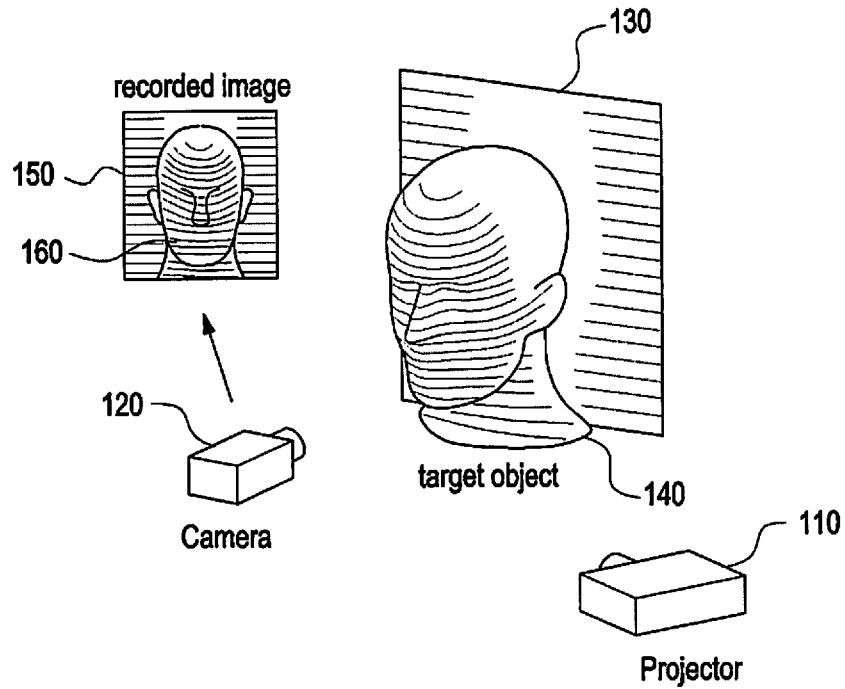
FIG. 2 is a diagram illustrating distortion of a source pattern caused by the depth of an object in the structured depth camera system, according to an embodiment.

FIG. 2 is a diagram illustrating distortion of a source pattern caused by the depth of an object in the structured depth camera system, according to an embodiment.

Referring to FIG. 2, the projector 110 radiates light by means of a source pattern. The radiated light may be reflected from a target object and captured by the camera 120. A recognition pattern of the captured light is a transformation of the source pattern of the light radiated from the projector 110.

The source pattern, which is an optical pattern of light radiated by the projector 110, may be different from the recognition pattern, which is an optical pattern captured by the camera 120. The pattern discrepancy may be caused by the parallax between a position in which the projector 110 radiates an optical pattern (source pattern) and a position in which the camera 120 captures an optical pattern (recognition pattern).

The source pattern used to radiate light by the projector 110 may be predetermined. The recognition pattern captured by the received light at the camera 120 may be analyzed based on the predetermined pattern. The analysis result may be used to measure the depths of the surfaces (i.e., a scene fragment) of the background and the one or more objects in the scene 130.

The optical patterns, which are the source pattern and the recognition pattern, may be generated by laser interference or projection. However, optical pattern generation is not limited to any particular scheme.

Figure 3:
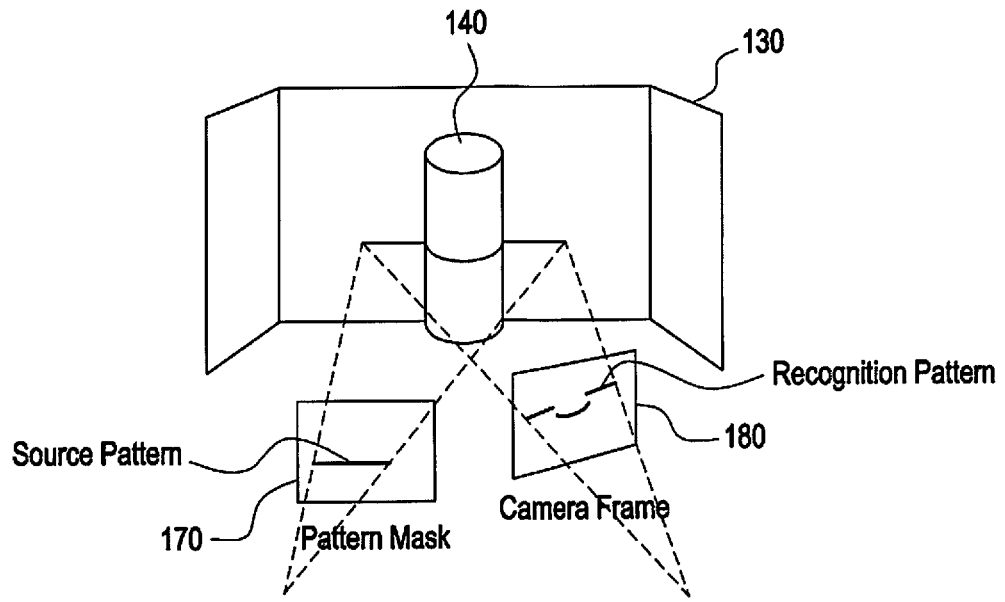
FIG. 3 is a diagram illustrating distortion of a recognition-pattern caused by a depth difference in a scene in the structured depth camera system, according to an embodiment.

FIG. 3 is a diagram illustrating distortion of a recognition pattern caused by a depth difference in a scene in the structured depth camera system, according to an embodiment.

Referring to FIG. 3, a recognition pattern in a capturing direction of the camera may be different from a source pattern in a radiation direction of the projector.

The source pattern that the projector uses to radiate light may be reflected from a background and one or more objects in a scene and captured by the camera. The source pattern of the projector may not match the source pattern captured by the camera.

For example, the source pattern of the projector may be transformed to the recognition pattern-captured by the camera in view of the parallax between the projector and the camera. The source pattern of the projector may include a plurality of first pattern fragments. The recognition pattern captured by the camera may include a plurality of second pattern fragments. The plurality of first pattern fragments may be reflected from fragments in the scene and transformed to the plurality of second pattern fragments.

For example, the source pattern is patterned in the pattern mask 170 and the recognition pattern is captured in the camera frame 180.

The recognition pattern captured by the camera may be transformed according to the depth of a corresponding scene fragment in view of a parallax effect at the position of the camera. Herein, the scene may refer to an area in which an optical pattern is reflected. Further, a scene fragment may refer to part of the scene. Accordingly, scene fragments may be specified according to the surfaces of the background and the one or more objects.

Figure 4:
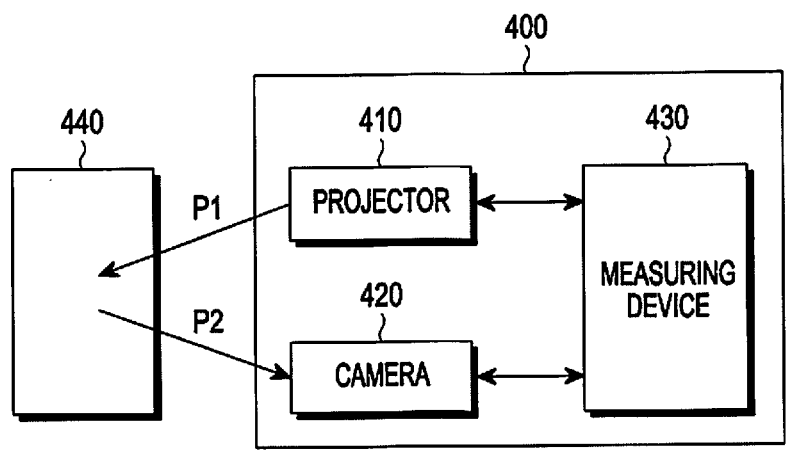
FIG. 4 is a block diagram illustrating the configuration of an electronic device for measuring a depth in the structured depth camera system, according to an embodiment.

FIG. 4 is a block diagram illustrating the configuration of an electronic device for depth measurement in the structured depth camera system, according to an embodiment.

Referring to FIG. 4, an electronic device 400 includes a projector 410 that projects beams, a camera 420 that detects the beams, and a measuring device 130 that measures the depth of a scene. The electronic device 400 may further include a memory.

The projector 410 may generate beams based on a source pattern P1. The beams may be projected onto a scene 440, a background, or an object. The scene 440 may refer to an area onto which the beams generated by the projector 410 are projected. The object may refer to an item existing in the scene. The background and the one or more objects in the scene may have different depths.

The beams generated by the projector 410 may be, but are not limited to, infrared (IR) beams, beams in various frequencies such as visible light, or ultraviolet (UV) light beams.

The camera 420 may receive the beams radiated based on the source pattern P1 and reflected from the scene 440, identify whether there is any reflected beam, and detect the brightness or intensity of the reflected beam. The camera 420 may convert the detected beam to an electrical signal and provide the electrical signal so that depth information of the scene is estimated. The camera 420 may detect a recognition pattern based on the received beam or the converted electrical signal and provide the detected recognition pattern so that the depth information of the scene is estimated.

The camera 420 may detect IR beams. However, the frequency band of a beam detectable by the camera 420 is not limited to an IR band. The camera 420 may be configured to detect a beam in the frequency band of the beams radiated from the projector 410. The camera 420 may be a two dimensional (2D) camera capable of detecting a signal in the frequency band of a reflected beam and capable of capturing a specific area (e.g., the area of the scene 440). The 2D camera may be configured as an array of photosensitive pixels. The photosensitive pixels of the 2D camera may be divided into pixels used to detect a ToF and pixels used to detect a reflected pattern. At least one of the photosensitive pixels in the 2D camera may be used to detect both the ToF and the reflected pattern.

The measuring device 430 may control operations of the projector 410 and the camera 420, and may obtain depth information of the background and/or the one or more objects in the scene 440 based on the reflected beam detected by the camera 420.

Figure 5:
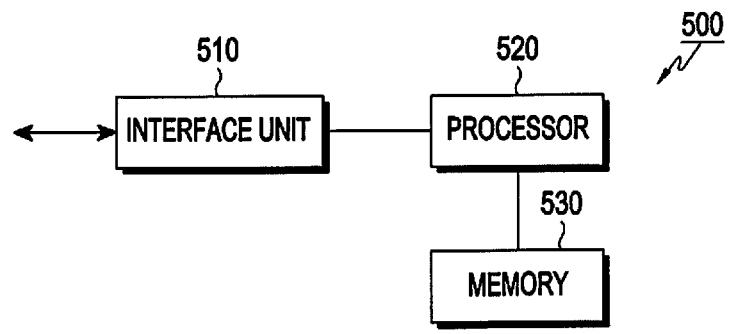
FIG. 5 is a block diagram illustrating the configuration of an apparatus for measuring a depth in the structured depth camera system, according to an embodiment.

FIG. 5 is a block diagram illustrating an apparatus for depth measurement in the structured depth camera system according to an embodiment.

Referring to FIG. 5, a measuring device 500 (or depth measuring device), which is an electronic device 400 for measuring the depth of a scene may be configured as an independent electronic device such as a smartphone, or the measuring device 500 may be equipped in an independent electronic device to measure a depth. In the latter case, a projector 410 and a camera 420 may reside inside the electronic device 400 including the depth measuring device 500.

The measuring device 500 may include an interface unit 510, a processor 520, and a memory 530. While the measuring device 500 is shown as including a single processor 520 in FIG. 5, the measuring device 500 may include multiple processors. The multiple processors in the measuring device 500 may perform separate and/or different functions. For example, a smartphone may include a first processor executing a communication function, a second processor executing a process function, and a third processor executing an application program.

The interface unit 510 may receive an electrical signal from light received by the camera. The electrical signal may be generated by converting light reflected from a background and/or one or more objects in a scene by the camera 420.

The at least one processor 520 may obtain the depth of the scene based on the electrical signal received from the interface unit 510.

The at least one processor 520 may identify a recognition pattern corresponding to the light received by the camera based on the electrical signal received through the interface unit 510. The at least one processor 520 may obtain a total distance value between properties of a partial source pattern corresponding to a target fragment in the source pattern and properties of a partial recognition pattern corresponding to the target fragment in the recognition pattern. The at least one processor 520 may estimate depth information of the target fragment based on the obtained total distance value.

The at least one processor 520 may identify per-property distance values of each feature point included in the target fragment based on the partial source pattern and the partial recognition pattern. The at least one processor 520 may obtain a total distance value by reflecting valid weight coefficients in the per-property distance values and summing the per-property distance values in which the valid weight coefficients of the respective feature points are reflected.

The at least one processor 520 may calculate a valid weight coefficient for a corresponding property (a $j^{th}$ property) by multiplying a normalization coefficient $v_j$ for the property (the $j^{th}$ property) by a distance-based weight $\pi_i$ for a corresponding feature point (an $i^{th}$ feature point) in a target fragment.

A first table that defines per-property distance values, a second table that defines per-property normalization coefficients, and a third table that defines distance-based weights for respective feature points included in one fragment may be recorded (stored) in the memory 530. The at least one processor 520 may obtain the total distance value based on information available from the memory 530, that is, the per-property distance values, the per-property normalization coefficients, and the distance-based weights of each feature point.

Figure 6:
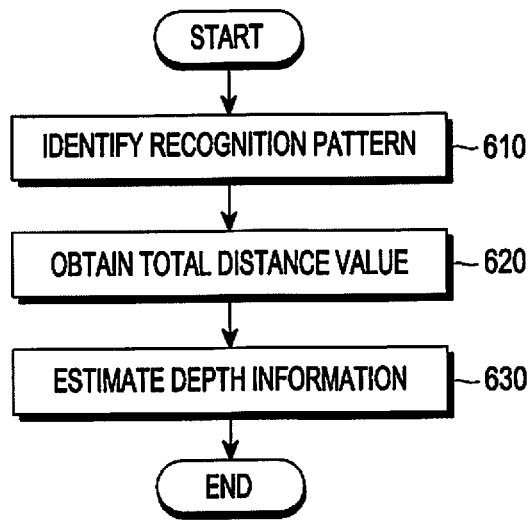
FIG. 6 is a flowchart illustrating a control operation for obtaining depth information of a scene by an electronic device in the structured depth camera system, according to an embodiment.

FIG. 6 is a flowchart illustrating a control operation for obtaining depth information of a scene by an electronic device in the structured depth camera system, according to an embodiment.

Referring to FIG. 6, the electronic device identifies a recognition pattern corresponding to one fragment in step 610. The recognition pattern may be identifiable based on an electrical signal provided by a camera. The electrical signal from the camera may be converted from light radiated by a projector and reflected from a background and one or more objects in a scene. The light radiated by the projector may be based on a source pattern.

The identification of the recognition pattern may include identifying feature points included in the recognition pattern and multiple properties of each of the feature points. The feature points may be located in the recognition pattern corresponding to one fragment in which distance values are obtained for depth estimation. The feature points may correspond to intersection points of a center cell and cells arranged in the form of a chessboard in a chessboard-shaped recognition pattern.

The electronic device obtains a total distance value in step 620. The total distance value may be obtained by calculating a distance value of each pair of feature points in one to one correspondence, that is, two feature points between the source pattern and the recognition pattern, and summing the distance values for each pair of feature points. The electronic device may consider valid weight coefficients in summing the calculated distance values of all pairs. The valid weight coefficient for a feature point may be used to determine the influence that the calculated distance value for a corresponding pair of feature points will have on obtaining the total distance value. The valid weight coefficients may be determined by taking into consideration the influence of a depth value or a probability of error occurrence. The influence of the depth value may be an influence when estimating the depth value. The probability of error occurrence may be a possibility that an error is generated in a pattern radiated by the projector and received by the camera.

A valid weight coefficient $\omega_{i,j}$ may be defined as the product between a normalization coefficient $v_j$ for a corresponding property (a $j^{th}$ property) and a distance-based weight $\pi_i$ for a corresponding feature point (an feature point). The normalization coefficient $v_j$ may be configured as a unique value for each property, and the distance-based weight $\pi_i$ may be configured based on a distance from a center cell.

The source pattern may be a partial source pattern corresponding to a part of one fragment, and the recognition pattern may also be a partial recognition pattern corresponding to the part of the fragment.

Once the total distance value is obtained as described above, the electronic device estimates depth information of a background and/or one or more objects in the fragment or the scene based on the total distance value in step 630.

Figure 7:
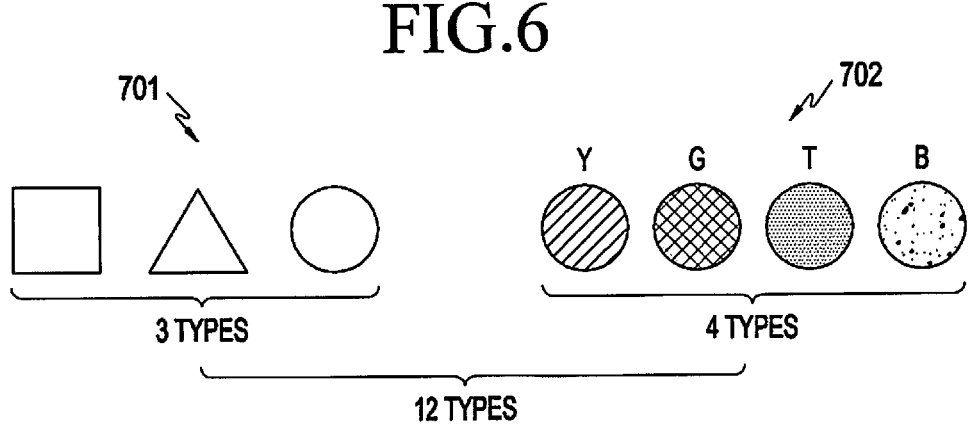
FIG. 7 is a diagram illustrating properties defined to measure a depth in the structured depth camera system, according to an embodiment.

FIG. 7 is a diagram illustrating properties defined for depth measurement in the structured depth camera system, according to an embodiment.

Referring to FIG. 7, a first property 701 (shape) and a second property 702 (color) are defined as properties for depth measurement in the structured depth camera system. For the first property 701, three types of shapes (square, triangle, and circle) are defined to distinguish feature points from one another, and for the second property 702, four types of colors (yellow, green, red, and blue) are defined to distinguish feature points from one another.

Therefore, 12 combinations may be produced from the first property 701 and the second property 702, and thus 12 types of feature points are available for one fragment.

Figure 8A:
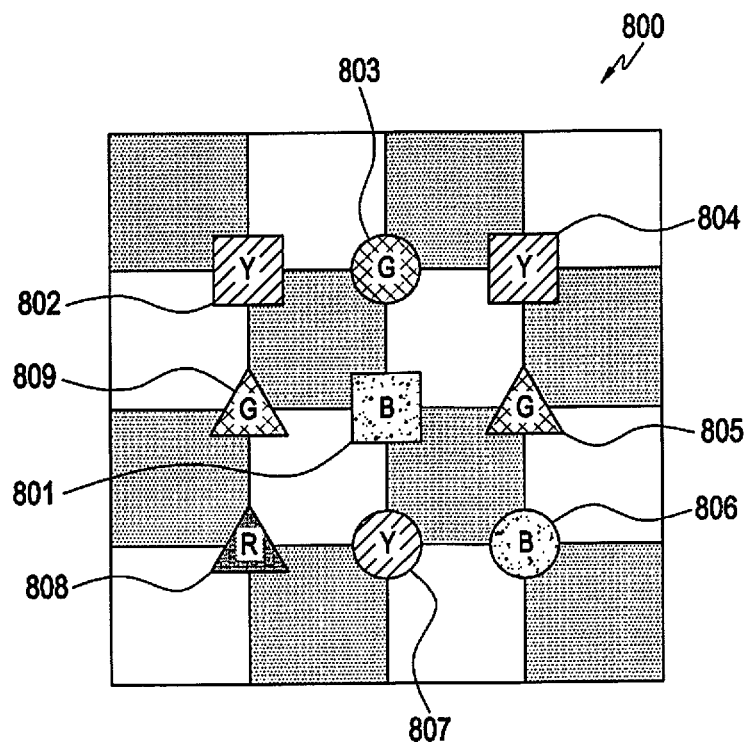
FIG. 8A is a diagram illustrating a source pattern of light radiated by a projector in the structured depth camera system, according to an embodiment.

FIG. 8A is a diagram illustrating a source pattern in which a projector radiates light in the structured depth camera system, according to an embodiment.

Referring to FIG. 8A, one fragment 800 has a source pattern in a chessboard-shaped cell structure. In the source pattern corresponding to the fragment 800, 16 cells are arranged in the form of a chessboard, where each feature point of 9 feature points is separately identifiable by combinations of a first property 701 (shape) and a second property 702 (color). Each feature point is located at an intersection of vertices of four cells.

According to one embodiment, a blue square first feature point 801 is located at the center vertex, and a yellow square second feature point 802 is located towards an upper left position of the first feature point 801. Third to ninth feature points may be located in a clockwise direction from the position of the second feature point. The third feature point 803 is a green circle, the fourth feature point 804 is a yellow square, the fifth feature point 805 is a green triangle, the sixth feature point 806 is a blue circle, the seventh feature point 807 is a yellow circle, the eighth feature point 808 is a red triangle, and the ninth feature point 809 is a green triangle.

In addition, if size is used as a third property, feature points included in one fragment may be distinguished by a predetermined number of different sizes. For example, if three different sizes are defined for the third property, 36 types in total may be defined to distinguish feature points from one another.

Figure 8B:
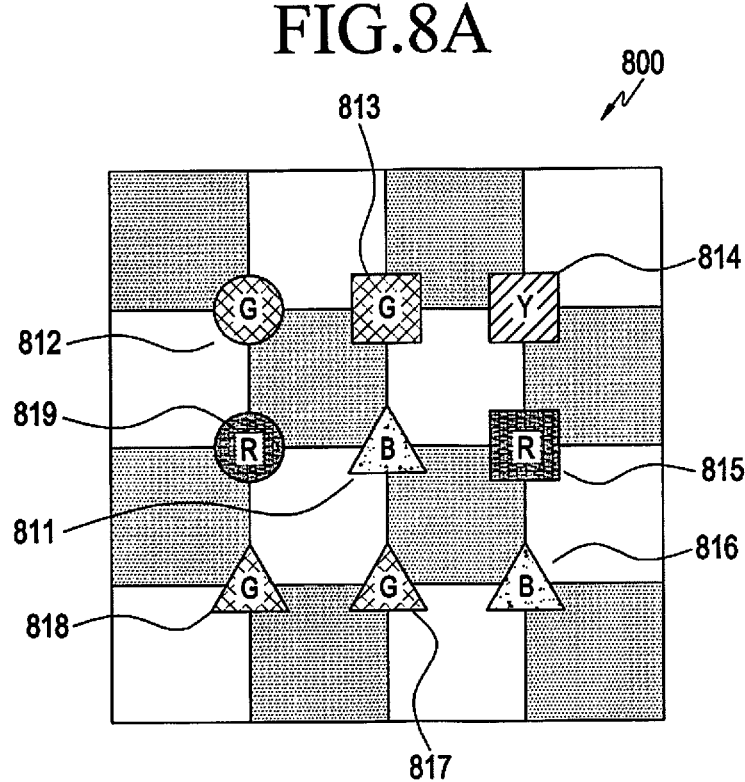
FIG. 8B is a diagram illustrating a recognition pattern received by light reflected from a background or an object in a scene in the structured depth camera system, according to an embodiment.

FIG. 8B is a diagram illustrating a recognition pattern received by light reflected from a background or an object in a scene at a camera in the structured depth camera system, according to an embodiment.

Referring to FIG. 8B, a recognition pattern corresponding to one fragment 800 is configured in a chessboard-shaped cell structure. In the recognition pattern, 16 cells are arranged in the form of a chessboard, in which each feature point of 9 feature points is separately identifiable by combinations of a first property 701 (shape) and a second property 702 (color). Each feature point is located at an intersection of vertices of four cells.

According to an embodiment, a blue triangular first feature point 811 is located at the center, and a green circular second feature 812 point is located towards an upper left position of the first feature point 811. Third to ninth feature points may be located in a clockwise direction from the position of the second feature point 812. The third feature point 813 is a green square, the fourth feature point 814 is a yellow square, the fifth feature point 815 is a red square, the sixth feature point 816 is a blue triangle, the seventh feature point 817 is a green triangle, the eighth feature point 818 is a green triangle, and the ninth feature point 819 is a red circle.

If size is used as a third property, feature points included in one fragment may be distinguished by a predetermined number of different sizes. For example, if three different sizes are defined for the third property, 36 types in total may be defined to distinguish feature points from one another.

As described above, it may be assumed that the projector has radiated light by the source pattern illustrated in FIG. 8A and the camera has received light reflected from one scene 800 as the recognition pattern illustrated in FIG. 8B in the structured depth camera system.

FIG. 9A is a diagram illustrating difference values that may be obtained by using the first property 701 (shape) in the structured depth camera system, according to an embodiment.

Referring to FIG. 9A, if feature points in the same position in the source pattern and the recognition pattern have the same shape, the difference $\delta_1$ between the feature points is defined as "0". If the feature point in the source pattern (or the feature point in the recognition pattern) is a square and the feature point in the recognition pattern (or the feature point in the source pattern) is a triangle, the difference $\delta_1$ between the feature points is defined as "3". If the feature point in the source pattern (or the feature point in the recognition pattern) is a square and the feature point in the recognition pattern (or the feature point in the source pattern) is a circle, the difference $\delta_1$ between the feature points is defined as "1". If the feature point in the source pattern (or the feature point in the recognition pattern) is a triangle and the feature point in the recognition pattern (or the feature point in the source pattern) is a circle, the difference $\delta_1$ between the feature points is defined as "2".

In FIG. 9A, the difference values defined based on the first property 701 may be tabulated and the table may be recorded (stored) in the memory. The table recorded in the memory may be used when the first property 701 is considered upon obtaining depth information.

FIG. 9B is a diagram illustrating difference values that may be obtained by using the second property 702 (color) in the structured depth camera system, according to an embodiment.

Referring to FIG. 9B, if feature points in the same position in the source pattern and the recognition pattern have the same color, the difference $\delta_2$ between the feature points is defined as "0". If the feature point in the source pattern (or the feature point in the recognition pattern) is yellow and the feature point in the recognition pattern (or the feature point in the source pattern) is green, the difference $\delta_2$ between the feature points is defined as "1". If the feature point in the source pattern (or the feature point in the recognition pattern) is yellow and the feature point in the recognition pattern (or the feature point in the source pattern) is red, the difference $\delta_2$ between the feature points is defined as "3". If the feature point in the source pattern (or the feature point in the recognition pattern) is yellow and the feature point in the recognition pattern (or the feature point in the source pattern) is blue, the difference $\delta_2$ between the feature points is defined as "8".

If the feature point in the source pattern (or the feature point in the recognition pattern) is green and the feature point in the recognition pattern (or the feature point in the source pattern) is red, the difference $\delta_2$ between the feature points is defined as "7". If the feature point in the source pattern (or the feature point in the recognition pattern) is green and the feature point in the recognition pattern (or the feature point in the source pattern) is blue, the difference $\delta_2$ between the feature points is defined as "5". If the feature point in the source pattern (or the feature point in the recognition pattern) is blue and the feature point in the recognition pattern (or the feature point in the source pattern) is red, the difference $\delta_2$ between the feature points is defined as "6".

In FIG. 9B, the difference values defined based on the second property 702 may be tabulated and the table may be recorded (stored) in the memory. The table recorded in the memory may be used, when the second property 702 is considered upon obtaining depth information.

For each of the first property 701 (shape) for which the distance values are defined in FIG. 9A and the second property 702 (color) for which the distance values are defined in FIG. 9B, a unique normalization coefficient $v_j$ may be configured.

A normalization coefficient $v_j$ for a $j^{th}$ property may be assigned based on the likelihood of the property being changed. That is, the normalization coefficient $v_j$ may, for example, lead to a higher weight being assigned for a property which is less likely to be changed, and a lower weight being assigned for a property which is more likely to be changed.

Accordingly, the normalization coefficient $v_1$ for the first property 701 (shape) may be assigned as "1" and the normalization coefficient $v_2$ for the second property 702 (color) may be assigned as "2.5". This is based on the premise that the second property 702 (color) is less likely to experience an error caused by change or distortion than the first property 701 (shape). That is, it is determined that the color property is less likely to be altered (changed) than the shape property due to light reflecting from an object.

FIG. 10 is a diagram illustrating distance-based weights $\pi_i$ (where i represents the indexes of feature points, assigned from the upper left position) which may be assigned to feature points in one fragment in the structured depth camera system, according to an embodiment.

Referring to FIG. 10, it is assumed that each of a source pattern and a recognition pattern corresponding to one fragment includes 9 feature points. A highest value of "1" is assigned as the distance-based weight $\pi_4$ of the center one of the 9 feature points. Distance-based weights may be assigned to the other feature points in inverse proportion to the distances of the feature points to the center feature point. That is, relatively nearby feature points above, under, to the left, and to the right of the center feature point are assigned a second largest value "0.75" as their distance-based weights $\pi_1$, $\pi_7$, $\pi_3$, and $\pi_5$. Feature points relatively far from the center feature point, that is, in diagonal positions (upper left, upper right, lower left, and lower right positions) from the center feature point are assigned a lowest value, "0.5", as their distance-based weights $\pi_0$, $\pi_2$, $\pi_6$, and $\pi_8$.

Considering that a smaller distance is more likely to affect a difference value, weights are assigned based on distances in the above manner. Further, even when the number of feature points included in one fragment increases, distance-based weights may be similarly assigned.

Accordingly, based on FIGS. 8A to 10, a total distance value for depth information estimation may be obtained in the structured depth camera system. For this purpose, the source pattern corresponding to one fragment 800, illustrated in FIG. 8A and the recognition pattern corresponding to the one fragment 800, illustrated in FIG. 8B may first be identified. That is, the first property 701 and the second property 702 of each of the 9 feature points in the source pattern of FIG. 8A may be identified, and the first property 701 and the second property 702 of each of the 9 feature points in the recognition pattern of FIG. 8B may be identified.

The 9 feature points of the source pattern are then sequentially selected, and the feature points in the same positions of the selected feature points in the recognition pattern are selected. The difference values between the first property 701 of the feature points selected in the source pattern and the first property 701 of the feature points selected in the recognition pattern may be calculated based on the difference values defined for the first property 701, as illustrated in FIG. 9A.

The first property 701 of a feature point 802 (the feature point in the upper left position of the center feature point) is square in the source pattern of FIG. 8A, whereas the first property 701 of a feature point 812 (the feature point in the upper left position of the center feature point) is circle in the recognition pattern of FIG. 8B. Therefore, the first property 701 difference value of the pair of feature points 802 and 812 may be identified as "1". The first property 701 of another feature point 803 (the feature point above the center feature point) is circle in the source pattern of FIG. 8A, whereas the first property 701 of another feature point 813 (the feature point above the center feature point) is square in the recognition pattern of FIG. 8B. Therefore, the first property 701 difference value of the pair of feature points 803 and 813 may be identified as "1".

Accordingly, the first property 701 difference values of all feature points may be identified as listed in Table 1, below. In Table 1, the feature points are indexed sequentially, starting from the upper left position of FIGS. 8A-8B.

TABLE 1

| Feature point index | Source pattern | Recognition pattern | Distance value |
| --- | --- | --- | --- |
| 0 | square | circle | 1 |
| 1 | circle | square | 1 |
| 2 | square | square | 0 |
| 3 | triangle | circle | 2 |
| 4 | square | triangle | 3 |
| 5 | triangle | square | 3 |
| 6 | triangle | triangle | 0 |
| 7 | circle | triangle | 2 |
| 8 | circle | triangle | 2 |

The second property 702 of the feature point 802 (the feature point in the upper left position of the center feature point) is yellow in the source pattern of FIG. 8A, whereas the second property 702 of the feature point 802 (the feature point in the upper left position of the center feature point) is green in the recognition pattern of FIG. 8B. Therefore, the second property 702 difference value of the feature point 802 may be identified as "1". The second property 702 of another feature point 803 (the feature point above the center feature point) is green in the source pattern of FIG. 8A, and the second property 702 of another feature point 813 (the feature point above the center feature point) is also green in the recognition pattern of FIG. 8B. Therefore, the second property 702 difference value of the feature point 813 may be identified as "0".

Accordingly, the second property 702 difference values of all feature points may be identified as listed in Table 2, below. In Table 2, the feature points are indexed sequentially, starting from the upper left position.

TABLE 2

| Feature point index | Source pattern | Recognition pattern | Distance value |
| --- | --- | --- | --- |
| 0 | yellow | green | 1 |
| 1 | green | green | 0 |
| 2 | yellow | yellow | 0 |
| 3 | green | red | 7 |
| 4 | blue | blue | 0 |
| 5 | green | red | 7 |
| 6 | red | green | 7 |

TABLE 2-continued

| Feature point index | Source pattern | Recognition pattern | Distance value |
| --- | --- | --- | --- |
| 7 | yellow | green | 1 |
| 8 | blue | blue | 0 |

The total distance value of the fragment 800 may be obtained by adding the sum of the identified first property 701 distance values of the respective feature points and the sum of the identified second property 702 distance values of the respective feature points. In obtaining the total distance value, a valid weight coefficient $\omega_{i,j}$ may be assigned to each feature point, for each property. A valid weight coefficient may be obtained, for example, by a normalization coefficient $v_{i,j}$ assigned to a property and a distance-based weight $\pi_i$ assigned to a feature point.

A total distance value $\Delta$ between a source pattern and a recognition pattern for one fragment may be obtained by using Equation (1), below.

$$\Delta = \Sigma_i \Sigma_j \delta_{(i,j)} \times \omega_{(i,j)} \tag{1}$$

Here, i represents the index of a feature point in the fragment, j represents the index of a property, $\delta_{i,j}$ represents a distance value of an $i^{th}$ feature point for a $j^{th}$ property, and $\omega_{i,j}$ represents a valid weight coefficient of the $i^{th}$ feature point for the $j^{th}$ property. i may be applied equally to the source pattern and the recognition pattern.

The valid weight coefficient $\omega_{i,j}$ of the $i^{th}$ feature point for the $j^{th}$ property in Equation 1 may be calculated by using Equation (2), below.

$$\omega_{i,j} = v_j \times \pi_i \tag{2}$$

Here, $v_j$ is a normalization coefficient for the $j^{th}$ property and $\pi_i$ is a distance-based weight for the $i^{th}$ feature point.

The normalization coefficient $v_j$ for the $j^{th}$ property may be assigned based on a possible change in the property. That is, a relatively high weight may be assigned to a property having a low likelihood of change for the normalization coefficient $v_j$, and a relatively low weight may be assigned to a property having a high likelihood of change for the normalization coefficient $v_j$.

For example, the normalization coefficient $v_1$ for the first property 701 (shape) may be assigned as "1", whereas the normalization coefficient $v_2$ for the second property 702 (color) may be assigned as "2.5". The assignment is based on the premise that the second property 702 (color) is less likely to experience errors caused by change or variation than the first property 701 (shape). That is, it is determined that light reflection from an object leads to a lower likelihood of alteration in the second property 702 (color) than in the first property 701 (shape).

The total distance value obtained in the manner as proposed above may be as listed in Table 3, below.

TABLE 3

| i | j | Source pattern | Recognition pattern | $\delta_i$ | $v_i$ | $\pi_j$ | $\omega_i$ | $\omega_i * \delta_i$ |
| --- | --- | --- | --- | --- | --- | --- | --- | --- |
| 0 | 0 | yellow | green | 1 | 2.5 | 0.5 | 1.25 | 1.25 |
|   | 1 | square | circle | 1 | 1 | 0.5 | 0.5 | 0.5 |
| 1 | 0 | green | green | 0 | 2.5 | 0.75 | 1.875 | 0 |
|   | 1 | circle | square | 1 | 1 | 0.75 | 0.75 | 0.75 |
| 2 | 0 | yellow | yellow | 0 | 2.5 | 0.5 | 1.25 | 0 |
|   | 1 | square | circle | 0 | 1 | 0.5 | 0.5 | 0 |
| 3 | 0 | green | red | 7 | 2.5 | 0.75 | 1.875 | 13.125 |
|   | 1 | triangle | circle | 2 | 1 | 0.75 | 0.75 | 1.5 |

TABLE 3-continued

| i | j | Source pattern | Recognition pattern | $\delta_i$ | $v_i$ | $\pi_j$ | $\omega_i$ | $\omega_i * \delta_i$ |
|---|---|---|---|---|---|---|---|---|
| 4 | 0 | blue | blue | 0 | 2.5 | 1 | 2.5 | 0 |
|   | 1 | square | triangle | 3 | 1 | 1 | 1 | 3 |
| 5 | 0 | green | red | 7 | 2.5 | 0.75 | 1.875 | 12.125 |
|   | 1 | triangle | square | 3 | 1 | 0.75 | 0.75 | 2.25 |
| 6 | 0 | red | green | 7 | 2.5 | 0.5 | 1.25 | 8.75 |
|   | 1 | triangle | triangle | 0 | 1 | 0.5 | 0.5 | 0 |
| 7 | 0 | yellow | green | 1 | 2.5 | 0.75 | 1.875 | 1.875 |
|   | 1 | circle | triangle | 2 | 1 | 0.75 | 0.75 | 1.5 |
| 8 | 0 | blue | blue | 0 | 2.5 | 0.5 | 1.25 | 0 |
|   | 1 | circle | triangle | 2 | 1 | 0.5 | 0.5 | 1 |

According to Table 3, a total distance value Δ of 48.625 may be obtained by summing the per-property distance values of the respective feature points.

Thus, the accuracy of determining distance values representing the depths of a background and one or more objects in a scene may be improved.

A method of detecting a source pattern, corresponding to a known fragment, from a recognition pattern, corresponding to a whole scene, is described below.

Figure 11A:
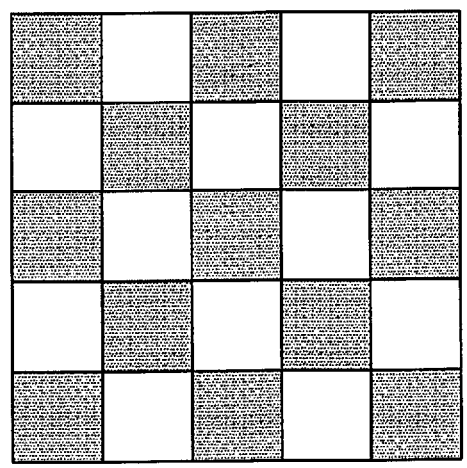
FIG. 11A is a diagram illustrating a cell structure of a pattern defined for depth measurement, according to an embodiment.

FIG. 11A illustrates a cell structure of a pattern defined for depth measurement, according to an embodiment.

Referring to FIG. 11A, the pattern may be in the form of a chessboard with cells arranged therein. Each of the cells may have one or more properties (i.e., color or luminance). The cells arranged in the form of a chessboard are defined by lines in the pattern.

Figure 11B:
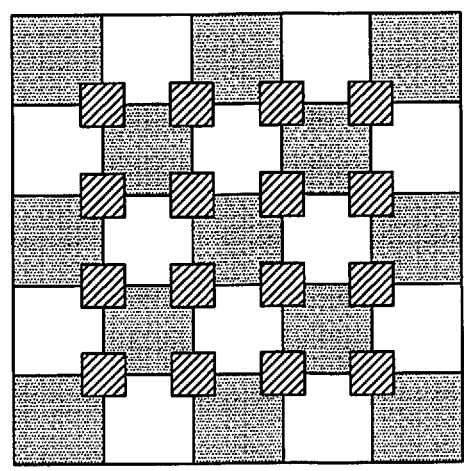
FIG. 11B is a diagram illustrating an arrangement of feature points in the pattern defined for depth measurement, according to an embodiment.

FIG. 11B illustrates an arrangement of feature points in the pattern defined for depth measurement, according to an embodiment.

Referring to FIG. 11B, a feature point may be disposed at an intersection of lines that define cells arranged in the form of a chessboard in the pattern. An intersection among lines corresponds to vertices of four cells. Each of the feature points may have one or more properties (i.e., color, luminance, and shape, size). The feature points may represent a value (corresponding to a robustness degree) of one or more of the properties. Robustness degree information about a feature point may represent how much the properties of the feature point are likely to be changed in view of the properties of neighboring cells or feature points.

According to an embodiment, 3-level brightness (black, gray and white) is used as a property for feature points. Further, 2-level brightness (black and gray) is used as a property for cells. The properties of the feature points and cells should be used such that each feature point or cell may be distinguished from neighboring feature points or cells. A center cell at the center of the pattern may also be used as a feature point. In this case, the feature point property may be used for the center cell, which will be treated as a feature point.

Figure 11C:
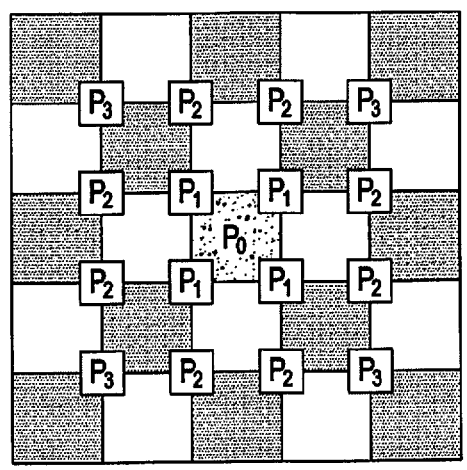
FIG. 11C is a diagram illustrating classification of feature points for weight assignment in the pattern defined for depth measurement, according to an embodiment.

FIG. 11C is a diagram illustrating distinguishing feature points from each other, for weight assignment in the pattern defined for depth measurement, according to an embodiment.

Referring to FIG. 11C, a highest weight $P_0$ may be assigned to a center cell that makes up the pattern. For the remaining feature points, weights may be assigned according to the distances of the feature points to the center cell.

According to an embodiment, a second highest weight $P_1$ is assigned to feature points corresponding to the vertices of the center cell, a third highest weight $P_2$ is assigned to feature points corresponding to the vertices of cells above, under, to the left, and to the right of the center cell, and a lowest weight $P_3$ is assigned to the remaining vertices of cells in diagonal directions to the center cell.

Figure 12:
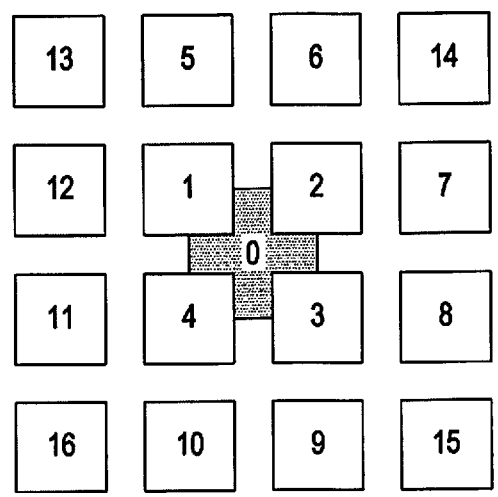
FIG. 12 is a diagram illustrating classification of feature points in the pattern defined for depth measurement, according to an embodiment.

FIG. 12 is a diagram distinguishing feature points from each other in the pattern defined for depth measurement, according to an embodiment.

Referring to FIG. 12, feature points may be indexed, starting from a center cell, in an ascending order of distances to the center cell.

For example, an identification index "0" may be assigned to the center cell, an identification index "1" may be assigned to a feature point in the upper left position of the center cell, and identification indexes "2", "3" and "4" may sequentially be assigned to feature points at the same distance level in a clockwise direction.

Identification indexes "5" and "6" may then be assigned to two feature points above the center cell, respectively, indexes "7" and "8" may be assigned to two feature points to the right of the center cell, respectively, indexes "9" and "10" may be assigned to two feature points under the center cell, respectively, and indexes "11" and "12" may be assigned to two feature points to the left of the center cell, respectively.

Subsequently, an identification index "13" may be assigned to the feature point at the upper left corner of the pattern, an identification index "14" may be assigned to the feature point at the upper right corner of the pattern, an identification index "15" may be assigned to the feature point at the lower right upper corner of the pattern, and an identification index "16" may be assigned to the feature point at the lower left upper corner of the pattern.

Figures 13A, 13B:
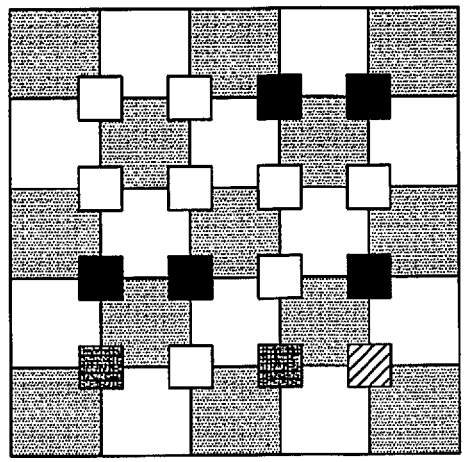
FIG. 13A is a diagram illustrating an example of assigning properties to feature points in the pattern defined for depth measurement, according to an embodiment.
FIG. 13B is a diagram illustrating an example of assigning properties to feature points in the pattern defined for depth measurement, according to an embodiment.

FIG. 13A is a diagram illustrating which properties are assigned to feature points in the pattern defined for depth measurement, according to an embodiment.

Referring to FIG. 13A, white is assigned to the feature points with identification indexes of 1, 2, 3, 5, 7, 10, 12, 13, and 15 (where respective identification indexes correspond to FIG. 12), gray is assigned to the feature points with the identification indexes of 9 and 16 (where respective identification indexes correspond to FIG. 12), and black is assigned to the feature points with the identification indexes of 4, 6, 8, 11, and 14 (where respective identification indexes correspond to FIG. 12).

FIG. 13B is a diagram illustrating where the properties assigned to the feature points are represented in the pattern defined for depth measurement, according to an embodiment.

Referring to FIG. 13B, a property value of "2" is assigned to the feature points in white (where white feature points correspond to FIG. 13A), a property value of "1" is assigned to the feature points in gray (where gray feature points correspond to FIG. 13A), and a property value of "0" is assigned to the feature points in black (where black feature points correspond to FIG. 13A).

Figures 14A, 14B:
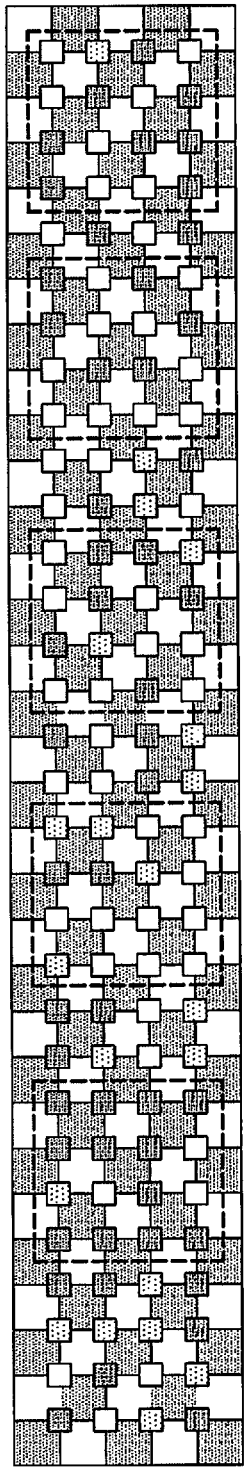
FIG. 14A is a diagram illustrating recognition patterns, according to an embodiment.
FIG. 14B is a diagram illustrating assigning property values to feature points in the patterns of FIG. 14A, according to an embodiment.

FIG. 14A is a diagram illustrating recognition patterns, according to an embodiment.

In FIG. 14A, five candidate patterns, similar to the pattern of FIG. 13B (hereinafter, referred to as "known pattern"), are selected. For example, the five candidate patterns have feature points with similar property values to those assigned to the feature points of the known pattern.

FIG. 14B is a diagram illustrating property values assigned to feature points in the patterns of FIG. 14A.

In FIG. 14B, property values are assigned to the respective feature points included in the recognition patterns of FIG. 14A. Thus, the property values assigned to the feature points of the five selected candidate patterns may be identified.

Total distance values for the five candidate patterns are calculated based on the known pattern of FIG. 13B, as listed in Table 4 below.

TABLE 4

| Weight zone | W→∞ | W = 1 | | | | | | | W = 0.75 | | | | | W = 0.5 | | | | Distance |
|---|---|---|---|---|---|---|---|---|---|---|---|---|---|---|---|---|---|---|
| Sub-property | 0 | 1 | 2 | 3 | 4 | 5 | 6 | 7 | 8 | 9 | 10 | 11 | 12 | 13 | 14 | 15 | 16 | |
| Recognized Key-point | 0 | 2 | 2 | 2 | 0 | 2 | 0 | 2 | 0 | 1 | 2 | 0 | 2 | 2 | 0 | 2 | 1 | |
| Key-Point A | 0 | 2 | 0 | 0 | 0 | 1 | 0 | 0 | 0 | 2 | 2 | 0 | 0 | 0 | 0 | 0 | 0 | 11 |
| Key-Point B | 0 | 2 | 0 | 1 | 2 | 2 | 0 | 1 | 2 | 2 | 2 | 2 | 2 | 1 | 1 | 2 | 2 | 11 |
| Key-Point C | 0 | 2 | 2 | 0 | 0 | 0 | 2 | 1 | 2 | 2 | 1 | 0 | 2 | 2 | 0 | 2 | 1 | 8.75 |
| Key-Point D | 0 | 2 | 2 | 2 | 1 | 2 | 2 | 0 | 0 | 2 | 0 | 1 | 0 | 2 | 2 | 2 | 2 | 10 |
| Key-point E | 0 | 0 | 2 | 2 | 0 | 2 | 0 | 2 | 0 | 0 | 2 | 2 | 2 | 2 | 0 | 2 | 2 | 4.75 |

It may be noted from Table 4 that the candidate pattern, Key-point E is closest in features to the known pattern, among the five candidate patterns.

Figures 15A, 15B:
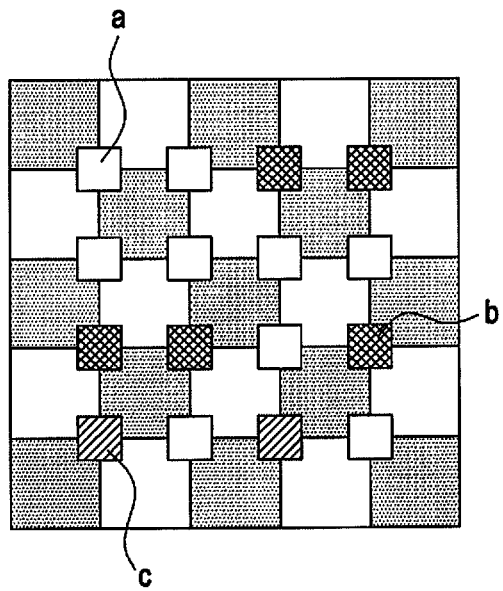
FIG. 15A is a diagram illustrating a situation which the properties of some feature points may not be identified in the pattern defined for depth management, according to an embodiment.
FIG. 15B is a diagram illustrating assigning property values to feature points in the pattern of FIG. 15A, according to an embodiment.

FIG. 15A is a diagram illustrating a situation in which the properties of some feature points may not be identified in the pattern defined for depth measurement, according to an embodiment in which it is assumed that the feature points with the identification indexes of 8, 13, and 16 (corresponding to the identification indexes of FIG. 12) may not be identified.

FIG. 15B is a diagram illustrating when the property values are assigned to the feature points in the pattern of FIG. 15A. It may be noted from FIG. 15B that there are no property values for the feature points having the identification indexes of 8, 13, and 16 (corresponding to the identification indexes of FIG. 12), of which the properties are not identifiable.

Figures 16A, 16B:
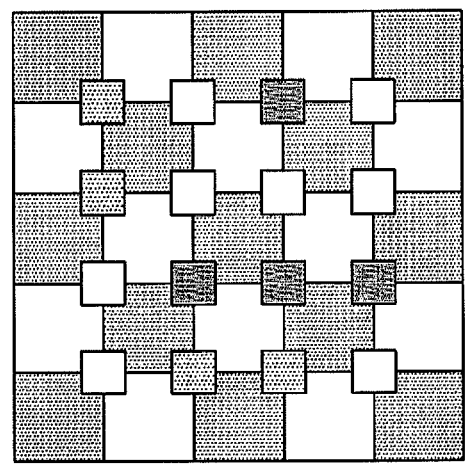
FIG. 16A is a diagram illustrating a known pattern for depth measurement, according to an embodiment.
FIG. 16B is a diagram illustrating assigning property values to feature points in the pattern of FIG. 16A, according to an embodiment.

FIG. 16A is a diagram illustrating a known pattern for depth measurement, according to an embodiment, and FIG. 16B is a diagram illustrating assigning property values to the feature points of the pattern illustrated in FIG. 16A.

The property values of the feature points which are not identifiable in the pattern of FIG. 15B may be estimated by use of the known pattern illustrated in FIG. 16B, as listed in Table 5 below.

Since the property value of a target feature point for the identification index of 13 (corresponding to the identification indexes of FIG. 12) is "1", considering all property values "0", "1", and "2" available for a corresponding feature point in the known pattern, the largest predictable distance value "1" corresponding to a case in which the property value of the corresponding feature point in the known pattern is "0" or "2" is estimated as the distance value Δ for the identification index of 13.

Finally, since the property value of a target feature point for the identification index of 16 (corresponding to the identification indexes of FIG. 12) is "2", considering all property values "0", "1", and "2" available for a corresponding feature point in the known pattern, the largest predictable distance value "2" corresponding to a case in which the property value of the corresponding feature point in the known pattern is "0" is estimated as the distance value Δ for the identification index of 16.

As is apparent from the foregoing description, the classification error rate of a structured depth camera system may be decreased simply by modifying a source pattern in a projector. That is, the number of accurately reconfigured 3D points may be increased, and holes and artifacts may be decreased.

TABLE 5

| Weight zone | W→∞ | W = 1 | | | | | | | W = 0.75 | | | | | W = 0.5 | | | | Distance |
|---|---|---|---|---|---|---|---|---|---|---|---|---|---|---|---|---|---|---|
| Sub-property | 0 | 1 | 2 | 3 | 4 | 5 | 6 | 7 | 8 | 9 | 10 | 11 | 12 | 13 | 14 | 15 | 16 | |
| Recognized Key-point | 0 | 2 | 2 | 0 | 0 | 2 | 0 | 2 | ? | 2 | 1 | 2 | 1 | ? | 1 | 2 | ? | |
| Target Key-Point | 0 | 2 | 2 | 0 | 0 | 2 | 0 | 2 | 0 | 1 | 1 | 2 | 1 | 1 | 2 | 2 | 2 | |
| Δ | 0 | 0 | 0 | 0 | 0 | 0 | 0 | 0 | 2 | 1 | 0 | 0 | 0 | 1 | 1 | 0 | 2 | 4.75 |

In Table 5, distance values Δ for the identification indexes of 8, 13, and 16 (corresponding to the identification indexes of FIG. 12) for which the property values have not been identified are estimated to be "2", "1", and "2", respectively, by using the known pattern. The estimates are the largest difference values based on the property values of target feature points.

For example, since the property value of a target feature point for the identification index of 8 (corresponding to the identification indexes of FIG. 12) is "0", considering all property values "0", "1", and "2" available for a corresponding feature point in the known pattern, the largest predictable distance value "2" corresponding to a case in which the property value of the corresponding feature point in the known pattern is "2" is estimated as the distance value Δ for the identification index of 8.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An apparatus for measuring a depth in a structured depth camera system including a projector and a camera for receiving light radiated by a source pattern from the projector and reflected from one or more objects in a scene, the apparatus comprising:
    an interface unit configured to receive an electrical signal based on light received from the camera;

at least one processor configured to:
- obtain depth information of the scene based on the electrical signal received from the interface unit,
- identify a recognition pattern corresponding to the light received by the camera based on the electrical signal,
- obtain a total distance value between properties of a partial source pattern corresponding to a target fragment in the source pattern and properties of a partial recognition pattern corresponding to the target fragment in the recognition pattern,
- estimate depth information of the target fragment based on the obtained total distance value,
- identify a per-property distance value of each feature point included in the target fragment based on the partial source pattern and the partial recognition pattern, and
- obtain the total distance value by reflecting a valid weight coefficient in the per-property distance value and summing the per-property distances in which the valid weight coefficient corresponding to each respective feature point is reflected,
- wherein a valid weight coefficient for a property is a product between a normalization coefficient for the property and a distance-based weight for a feature point in the target fragment; and a memory configured to store a first table defining per-property distance values, a second table defining per-property normalization coefficients, and a third table defining a distance-based weight for each feature point included in one fragment.

2. The apparatus of claim 1, wherein the at least one processor is further configured to obtain the total distance value $\Delta$ according to the following equation:

$$\Delta = \Sigma_i \Sigma_j \delta_{(i,j)} \times \omega_{(i,j)}$$

where i represents an index indicating a feature point in the fragment, j represents an index indicating a property, $\delta_{(i,j)}$ represents a distance value of an $i^{th}$ feature point for a $j^{th}$ property, and $\omega_{i,j}$ represents a valid weight coefficient of the $i^{th}$ feature point for the $j^{th}$ property.

3. The apparatus of claim 2, wherein the at least one processor is further configured to obtain the valid weight coefficient $\omega_{i,j}$ according to the following equation:

$$\omega_{i,j} = v_j \times \pi_i$$

where $v_j$ represents a normalization coefficient for the $j^{th}$ property, and $\pi_i$ represents a distance-based weight for the $i^{th}$ feature point.

4. The apparatus of claim 1, further comprising a memory configured to store a table defining a distance value of an $i^{th}$ feature point for a $j^{th}$ property,
wherein i represents an index indicating a feature point included in one fragment, and j represents an index indicating a property identifying one feature point.

5. The apparatus of claim 4, wherein the at least one processor is further configured to:
- obtain a distance value corresponding to each feature point included in the target fragment from the table stored in the memory based on the partial source pattern and the partial recognition pattern, and
- obtain the total distance value by summing the obtained distance values corresponding to the respective feature points included in the target fragment.

6. A method of measuring a depth in a structured depth camera system including a projector and a camera for receiving light radiated by a source pattern from the projector and reflected from one or more objects in a scene, the method comprising:
- identifying a recognition pattern corresponding to the light received by the camera based on an electrical signal;
- obtaining a total distance value between properties of a partial source pattern corresponding to a target fragment in the source pattern and properties of a partial recognition pattern corresponding to the target fragment in the recognition pattern;
- estimating depth information of the target fragment based on the obtained total distance value;
- identifying a per-property distance value of each feature point included in the target fragment based on the partial source pattern and the partial recognition pattern;
- obtaining the total distance value by reflecting a valid weight coefficient in the per-property distance value and summing the per-property distances in which the valid weight coefficient corresponding to each respective feature point is reflected;
- obtaining from a table stored in a memory, a normalization coefficient for a property (a $j^{th}$ property) and a distance-based weight for a feature point (an $i^{th}$ feature point) in the target fragment; and
- calculating a valid weight coefficient $\omega_{i,j}$ for the property (the $j^{th}$ property) by multiplying the obtained normalization coefficient $v_j$ by the obtained distance-based weight $\pi_i$.

7. The method of claim 6, wherein the total distance value $\Delta$ is obtained according to the following equation:

$$\Delta = \Sigma_i \Sigma_j \delta_{(i,j)} \times \omega_{(i,j)}$$

where i represents an index indicating a feature point in the fragment, j represents an index indicating a property, $\delta_{i,j}$ represents a distance value of an $i^{th}$ feature point for a $j^{th}$ property, and $\omega_{i,j}$ represents a valid weight coefficient of the $i^{th}$ feature point for the $j^{th}$ property.

8. The method of claim 7, wherein the valid weight coefficient $\omega_{i,j}$ is obtained according to the following equation:

$$\omega_{i,j} = v_j \times \pi_i$$

where $v_j$ represents a normalization coefficient for the $j^{th}$ property, and $\pi_i$ represents a distance-based weight for the $i^{th}$ feature point.

9. The method of claim 6, wherein obtaining a total distance value comprises:
- obtaining a distance value corresponding to each feature point included in the target fragment from a table defining a distance value of an $i^{th}$ feature point for a $j^{th}$ property, stored in a memory based on the partial source pattern and the partial recognition pattern; and
- obtaining the total distance value by summing the obtained distance values corresponding to the respective feature points included in the target fragment,
wherein i represents an index indicating a feature point included in one fragment, and j represents an index indicating a property identifying one feature point.

* * * * *